April 3, 1928.
W. W. WELLS
1,664,870
TRANSMISSION MECHANISM
Filed Dec. 15, 1924     2 Sheets-Sheet 2
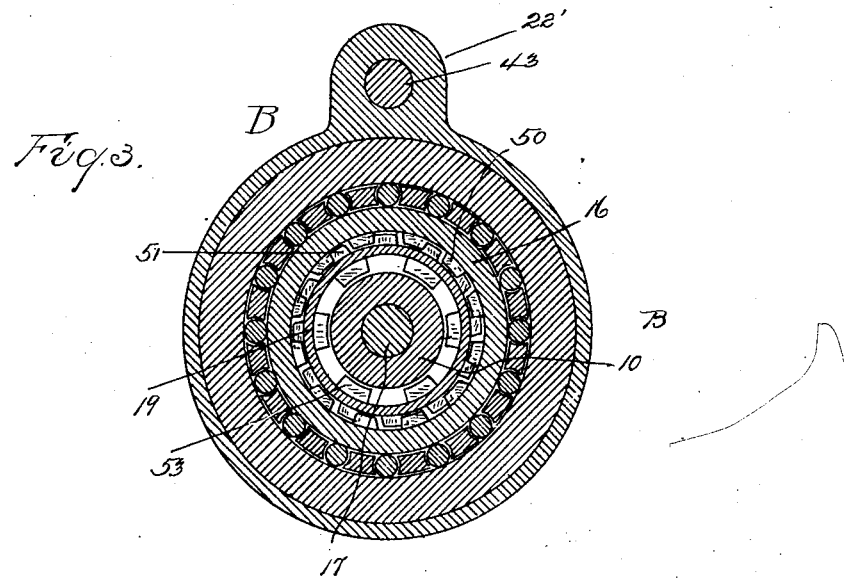
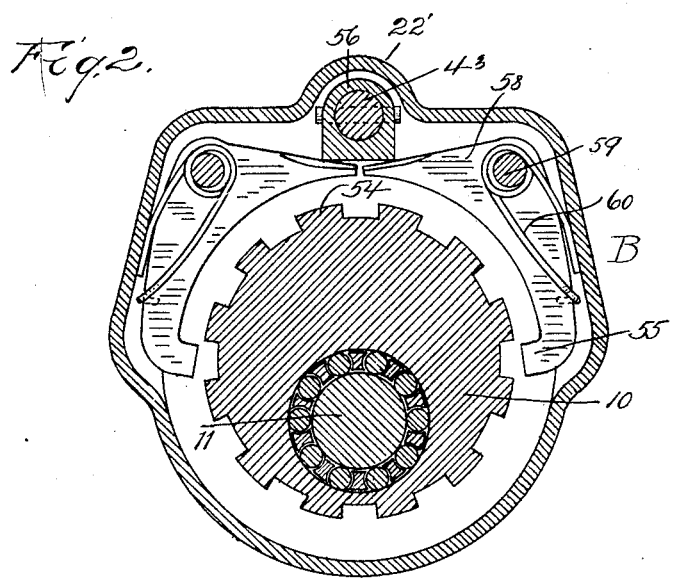

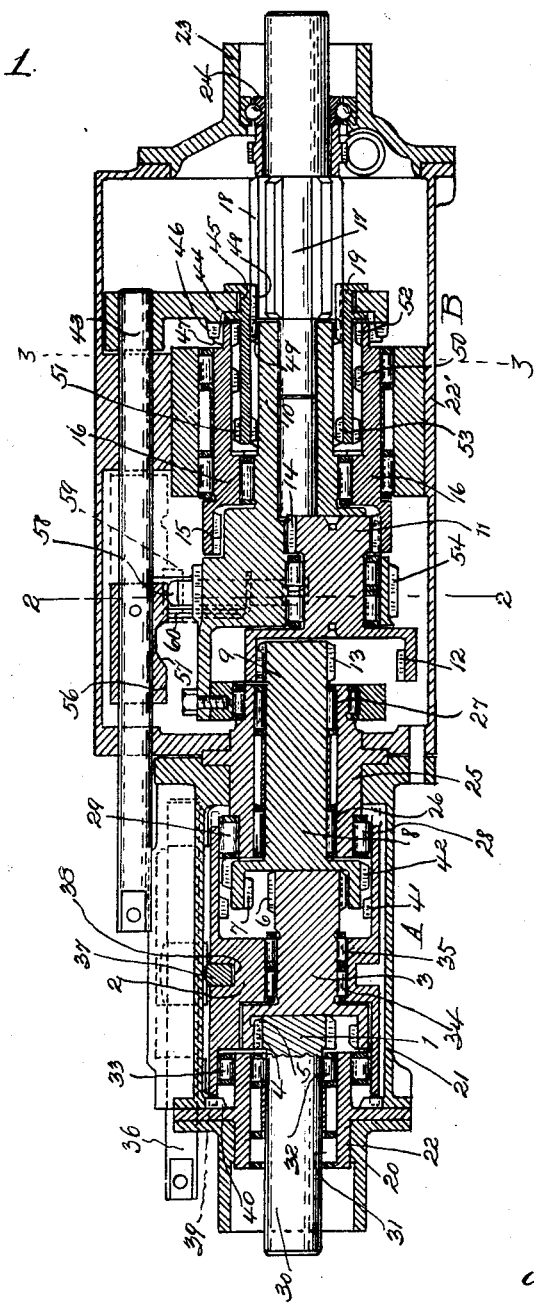

Patented Apr. 3, 1928.

1,664,870

UNITED STATES PATENT OFFICE.

WALTER W. WELLS, OF LANSING, MICHIGAN, ASSIGNOR TO REO MOTOR CAR COMPANY, OF LANSING, MICHIGAN, A CORPORATION OF MICHIGAN.

TRANSMISSION MECHANISM.

Application filed December 15, 1924. Serial No. 756,093.

The invention relates to transmission mechanisms adapted for use in motor vehicles and consists in the novel arrangement and combination of parts as hereinafter fully described.

One of the objects of the invention is to provide an improved arrangement of the reduction gears in order to obtain a transmission having four forward speeds and two reversing speeds. Another object is to provide a transmission mechanism having two units each of the eccentric planetary type, one of said units having a direct drive and a drive at a reduced ratio and the other unit having a direct drive, a drive at a reduced ratio and a reverse drive at a reduced ratio.

In the drawings:

Figure 1 is a longitudinal section through the transmission mechanism;

Figure 2 is a transverse section on the line 2—2 of Figure 1;

Figure 3 is a transverse section on the line 3—3 of Figure 1.

My improved transmission may be considered as comprising the two units A and B, each having means for separately controlling the gear reductions therein. The unit A comprises essentially a driving pinion 1, a planet-carrier 2, revoluble coaxially with the driving pinion and carrying an eccentric bearing for mounting the planet gear member 3, the latter being provided with internal teeth 4 meshing with the teeth 5 of the pinion 1. The planet gear member is also provided with external teeth 6 meshing with the internal teeth 7 of a rotatable member 8 coaxial with the pinion 1.

The second unit comprises a pinion 9 preferably formed integral with the member 8, a second planet-carrier 10 revoluble coaxially with the pinion 9 and provided with an eccentric bearing for receiving the planet gear member 11, this gear having the internal teeth 12 meshing with the teeth 13 of the pinion 9. The planet gear member 11 is also provided with external teeth 14 adapted to mesh with the internal teeth 15 of a revoluble sleeve 16. 17 is the driven shaft in axial alignment with the pinions 1 and 9 and provided with splines 18 for engaging a second sleeved member 19 which is free to slide on the shaft and always turns with it.

The various ratios obtainable by the transmission mechanism are obtained by alternatively coupling the various units above mentioned in different combinations either by fixing one or more of the revoluble parts against rotation or by directly securing two of said revoluble parts together to compel rotation as a unit.

The mechanism is housed in a suitable transmission casing which, as shown, comprises a plurality of separate parts to enable the various gears to be assembled therein. As shown, the transmission case comprises the front housing 20 and the intermediate housing 21 which together form the casing for the unit A and serve to position a bearing sleeve 22. A second intermediate casing member 22' forms a housing for the unit B and is connected to a rear housing 23, the latter being provided with ball bearings 24 for the driven shaft 17. 25 is an intermediate bearing sleeve secured to the casing between the portions 21 and 22'. 26 and 27 are roller bearings arranged within the intermediate sleeve 25 and rotatably supporting the member 8. 28 and 29 are other roller bearings mounted on the outer periphery of said bearing sleeve and forming the bearings for the adjacent ends of the planet-carriers 2 and 10. The pinion 1 is preferably formed integral with the driving shaft 30, the latter being rotatably supported by the roller bearings 31 and 32 within the bearing sleeve 22. 33 is a roller bearing for supporting the forward end of the planet carrier 2, this bearing permitting a longitudinal sliding movement of said carrier. The planet gear member 3 is rotatably supported by the roller bearings 34 and 35.

The alternative gear ratios in the unit A are obtained by longitudinally shifting the carrier 2, this being accomplished by the movement of the control rod 36 which carries a shifting fork 37 engageable with an annular recess 38 in the periphery of the carrier 2. In the forward position of the rod 36 the carrier is locked to the transmission case by reason of the fact that the clutch teeth 39 at the forward end of the carrier engage the clutch teeth 40 on the fixed bearing sleeve 22. On the other hand, when the rod 36 is in the rear position the carrier 2 is directly coupled to the rotatable member 8, this being obtained by the engagement of the clutch teeth 41 on the carrier engaging the corresponding clutch teeth 42 formed on the periphery of the member 8.

The alternative ratios in the unit B are obtained by actuating the second shifting rod 43 carrying a shifting fork 44 engaging the annular recess 45 of the intermediate sleeve 19. The shifting fork 44 has clutch teeth 46 projecting therefrom adapted to engage corresponding clutch teeth 47 on the revoluble sleeve 16 when the shifting fork is in its forward position as illustrated in Figure 1. The intermediate sleeve 19 has the internal splines 48 of sufficient length to simultaneously engage the splines 18 of the driven shaft and similar splines 49 formed on the planet carrier 10 adjacent to said driven shaft.

When the shifting fork 44 is moved rearwardly to the intermediate position shown in dotted lines in Figure 1 the splines 48 of the intermediate sleeve no longer engage the splines 49 of the carrier and the clutch teeth 46 and 47 are also disengaged. In this position, however, the sleeve 16 is directly coupled to the intermediate sleeve 19 by means of the internal teeth 50 on the former meshing with the external teeth 51 of the latter. When the shifting fork is moved to its rearmost position the intermediate sleeve 19 has the external clutch teeth 51 engaging with internal clutch teeth 52 on the revoluble sleeve 16 and also has the internal teeth 53 engaging the external clutch teeth 49 of the carrier 10.

In order to provide means for alternatively fixing the carrier 10, against rotation it is provided with external splines 54 adapted to be engaged by the dogs 55 when the shifting rod 43 is in its intermediate position. For actuating the dogs a cam 56 is secured to the shifting rod having a cam slot 57 for receiving the levers 58. These levers are fulcrumed by pins 59 and are normally urged towards the cam slot 57 by the springs 60, this position compelling the dogs 55 to engage the splines 54 of the carrier 10. When, however, the shifting rod 43 is moved either to its forward or rearward position, the levers 58 ride out of the cam slot 57, thus releasing the dogs 55 from the splines 54 and permitting rotation of the carrier 10.

The operation of the shifting rods for obtaining the various ratios is as follows: The direct drive is obtained by having both levers in rearmost position. With this arrangement of the parts the driven shaft 17 is directly connected to the sleeve 16 by the engagement of splines 18 with the splines 48 and teeth 51 with teeth 52. The driven shaft is also coupled to the carrier 10 by means of teeth 53 engaging teeth 49. The carrier 10 is at the same time free to revolve because the dogs 55 are withheld from the splines 54 and therefore, all of the revoluble parts in the unit B revolve together including the pinion 9, carrier 10, planet gear member 11, sleeve 16, intermediate sleeve 19 and driven shaft 17. Unit A also has a direct drive by reason of the coupling of the planet carrier 2 to the internal gear 7 by reason of the engagement of clutch teeth 41 and 42. Thus, the pinion 1, planet carrier 2, planet gear member 3 and member 8 all rotate together there being no relative rotation of the parts.

The next highest forward speed may be obtained by shifting the control rod 36 to its forward position, this coupling the carrier 2 to the transmission case through the engagement of clutch teeth 39 and 40. Under these conditions the carrier 2 is held from rotation, thereby compelling the planet gear member 3 to rotate in its bearings and in turn, to drive the member 8 at a reduced ratio depending upon the number of teeth in the respective gears.

Low speed is obtained by leaving the control rod 36 in its forward position and shifting the control rod 43 to its intermediate position where the levers 58 ride into the cam slot 57 and cause dogs 55 to prevent rotation of the carrier 10. The revoluble sleeve 16 is directly connected to the driven shaft 17 by reason of the engagement of clutch teeth 50 and 51 and splines 18 and 48. With this arrangement therefore, the eccentric gear 11 is caused to rotate about its bearings thus, transmitting the torque to the sleeve 16 and causing the same to revolve at a reduced ration depending again, upon the number of teeth in the respective gears. Since the driven shaft 17 is directly connected to the sleeve 16, the former will be rotated in a forward direction. The total reduction of the transmission will be the combined reductions of units A and B.

Another forward speed of a different ratio may be obtained by leaving the shifting lever 43 in intermediate position as last described and shifting the control rod 36 to its rearward or direct drive position. In this case, the ratio obtained will be that of the gears in the unit B alone.

For obtaining the reverse speed, the shifting rod 43 is moved to its forward position, thus allowing rotation of the carrier 10 and preventing the rotation of the sleeve 16, the latter being accomplished through the engagement of clutch teeth 46 and 47. The carrier 10 is directly coupled to the driven shaft 17 through the medium of the intermediate sleeve 19 which has its splines 48 engaging both the splines 49 on the carrier and the splines 18 on the driven shaft. With this arrangement, therefore, the carrier 10 is caused to revolve at reduced speed in the opposite direction to the pinion 9 and this reverse rotation is directly communicated to the driven shaft. There are two reverse speed ratios obtainable, one with the unit A arranged for direct driving and the other when said unit is arranged for the indirect drive through the planet gear member.

From the above description it will be seen that my improved arrangement provides for four forward speeds and two reversing speeds and by properly proportioning the number of teeth on the various gears any desired ratios may be obtained. As a specific example, of the ratios obtainable the gears 5, 4, 6, 7, 13, 12, 14 and 15 may have respectively 18, 23, 18, 23, 18, 35, 20 and 37 teeth.

The following gear ratios are then available:

Forward speeds:
    1.0 to 1.0
    1.63 to 1.0
    3.6 to 1.0
    5.87 to 1.0

Reverse speeds:
    2.6 to 1.0
    4.25 to 1.0

What I claim as my invention is:—

1. In a transmission, the combination with a pair of coaxial gears, a planet carrier, a planet gear member meshing with both of said coaxial gears, a longitudinally slidable sleeve, a driven shaft continuously clutched to said sleeve and means for longitudinally sliding said sleeve to a plurality of longitudinal positions, one of said positions being arranged to clutch the planet carrier to said driven shaft and to simultaneously prevent rotation of the planet gear member, another of said positions clutching one of said coaxial gears to said driven shaft and a third position clutching both the planet carrier and one of said coaxial gears to said driven shaft and means for preventing rotation of the planet carrier when said sleeve is in its intermediate position.

2. A transmission comprising a driving gear, a driven gear coaxial therewith, a planet gear member meshing with both of said gears, a rotatable planet carrier on which said planet gear member is journaled, a driven shaft, a longitudinally slidable sleeve splined to said driven shaft, means for shifting said sleeve into three positions of adjustment, means for preventing rotation of said planet carrier when said sleeve is in its intermediate position, means for alternatively clutching said sleeve to said planet carrier and said driven gear and to said driven gear alone, and means for preventing rotation of said driven gear in the first-mentioned position of said sleeve.

3. A transmission comprising a driving shaft, a driven shaft and a rotatable member in axial alignment, a pair of planet gear members, revoluble planet carriers on which said planet gear members are journaled, coaxial gears meshing with each of said planet gear members, means for alternatively clutching one of said planet carriers to one of said coaxial gears or to prevent rotation of the same, a longitudinally slidable sleeve splined to said driven shaft, clutch teeth on said sleeve, clutch teeth on said planet carriers, a rod for longitudinally sliding said clutch sleeve, a cam on said rod, and levers actuated by said cam to alternatively prevent rotation of said planet carrier and to permit rotation of the same.

4. In a transmission, the combination with a driving pinion, a revoluble planet carrier, a planet gear member journaled on said carrier and meshing with said driving pinion, a gear coaxial with said pinion also meshing with said planet gear member, a sleeve having clutch teeth thereon, means for longitudinally sliding said sleeve to clutch said driven shaft to said planet carrier or to one of said coaxial gears, pivotally mounted dogs adapted to engage said planet carrier and a cam for operating said dogs to prevent rotation of said planet carrier in one longitudinal position of said sleeve.

5. A transmission comprising a pair of coaxial gears, a revoluble planet carrier, a planet gear member journaled in said planet carrier, and meshing with said coaxial gears, means for alternatively clutching said carrier to one of said coaxial gears or preventing rotation of said carrier, a driven shaft, a sleeve splined on said shaft, means for clutching said sleeve to said carrier, a slide rod controlling said clutch connection, a cam on said rod and members actuable by said cam to alternatively prevent or permit rotation of said carrier.

6. A transmission comprising a driving shaft having an external gear, a driven shaft co-axial therewith, an internal gear adapted to be connected to said driven shaft, a coaxial shaft intermediate said driving and driven shafts having an internal gear at the driving end thereof and an external gear at the driven end, a rotatable carrier between said driving and intermediate shafts, a compound gear eccentrically journaled in said carrier and drivingly connecting the external gear on said driving shaft to the internal gear on said intermediate shaft, means for alternatively fixing said carrier against rotation and coupling the same to said intermediate shaft, a second rotatable carrier between said intermediate shaft and said driven shaft, a second compound gear eccentrically journaled in the second carrier and drivingly connecting the external gear on the intermediate shaft with the internal gear coupled to said driven shaft and means for alternatively fixing said second carrier against rotation and coupling the same to said driven shaft.

7. A transmission comprising a driving shaft having an external gear, a driven shaft, a sleeve surrounding said driven shaft having an internal gear, a co-axial shaft intermediate said driving and driven shafts having an internal gear at the driving end and an external gear at the driven end thereof, a rotatable carrier between said driving and intermediate shafts, a compound gear eccentrically journaled in said carrier and drivingly connecting the external gear on said driving shaft with the internal gear on said intermediate shaft, means for alternatively fixing said carrier against rotation and coupling the same to said intermediate shaft, a second rotatable carrier between said intermediate shaft and said driven shaft, a second compound gear eccentrically journaled in the second carrier and drivingly connecting the external gear on said intermediate shaft with the internal gear on said sleeve, and clutching means longitudinally shiftable to a plurality of positions, one position clutching said driven shaft to both said sleeve and said second carrier, a second position clutching said driven shaft to said sleeve and simultaneously fixing said second carrier from rotation and a third position fixing said sleeve against rotation and clutching said driven shaft to said second carrier.

In testimony whereof I affix my signature.

WALTER W. WELLS.